(12) United States Patent
Nelson

(10) Patent No.: US 8,529,317 B2
(45) Date of Patent: Sep. 10, 2013

(54) SPEED CONTROL DEVICE IN A PNEUMATIC POWER TOOL

(75) Inventor: Anders Urban Nelson, Alvsjo (SE)

(73) Assignee: Atlas Copco Industrial Technique Aktiebolag, Stockholm (SE)

( * ) Notice: Subject to any disclaimer, the term of this patent is extended or adjusted under 35 U.S.C. 154(b) by 322 days.

(21) Appl. No.: 13/122,227

(22) PCT Filed: Oct. 2, 2009

(86) PCT No.: PCT/SE2009/000433
§ 371 (c)(1),
(2), (4) Date: May 5, 2011

(87) PCT Pub. No.: WO2010/039080
PCT Pub. Date: Apr. 8, 2010

(65) Prior Publication Data
US 2011/0217909 A1    Sep. 8, 2011

(30) Foreign Application Priority Data
Oct. 3, 2008   (SE) ...................................... 0802094

(51) Int. Cl.
B24B 27/08   (2006.01)
(52) U.S. Cl.
USPC ............. 451/294; 451/353; 451/344; 415/44; 415/904
(58) Field of Classification Search
USPC .. 137/47–58; 415/36, 44, 904; 451/344–359
See application file for complete search history.

(56) References Cited

U.S. PATENT DOCUMENTS

| 2,326,396 | A | * | 8/1943 | Schaedler | 418/43 |
| 2,925,089 | A | * | 2/1960 | Rockwood et al. | 415/36 |
| 3,279,485 | A | * | 10/1966 | Alexander | 137/50 |
| 5,314,299 | A | | 5/1994 | Jacobsson | |
| 5,775,355 | A | * | 7/1998 | Maier et al. | 137/1 |
| 8,292,569 | B2 | * | 10/2012 | Sitzler | 415/25 |
| 8,347,979 | B2 | * | 1/2013 | Young et al. | 173/168 |
| 2008/0160887 | A1 | * | 7/2008 | Hutchins | 451/357 |
| 2011/0085891 | A1 | * | 4/2011 | Matsuo | 415/151 |

FOREIGN PATENT DOCUMENTS

EP   0575301 A1   12/1993
GB   801317       9/1958

OTHER PUBLICATIONS

International Search Report dated Oct. 23, 2009 issued in International Appln. No. PCT/SE2009/000433.

* cited by examiner

Primary Examiner — Lee D Wilson
Assistant Examiner — Tyrone V Hall, Jr.
(74) Attorney, Agent, or Firm — Holtz, Holtz, Goodman & Chick, PC

(57) ABSTRACT

A speed control device is provided for a pneumatic power tool which includes a housing with a pressure air inlet, an output spindle, and an air turbine with a turbine wheel drivingly connected to the output spindle. Nozzles are arranged for directing motive air onto the turbine wheel. The speed control device includes a valve unit for controlling pressure air flow through the nozzles in response to a speed responsive parameter. The plurality of nozzles are divided into n separate nozzle groups having individual air feed through individual air feed passages (n is an integer, n>1). The valve unit is capable of being actuated into n states for controlling air feed to the n nozzle groups, whereby for each subsequent state, x ($1 \leq x \leq n$, x is an integer) air feed passages are connected to the pressure air inlet such that nozzle groups 1 to x are fed with air.

12 Claims, 5 Drawing Sheets

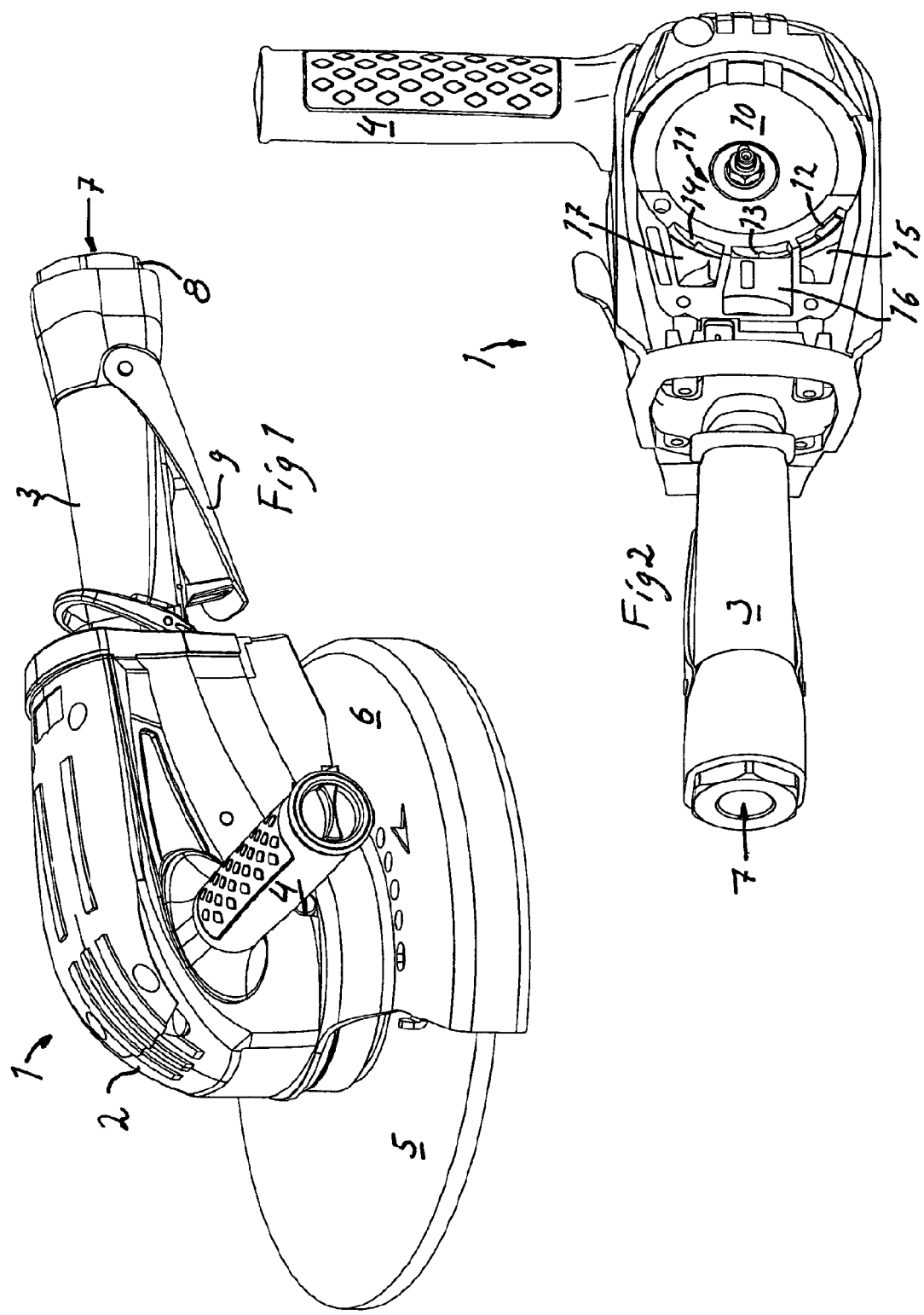

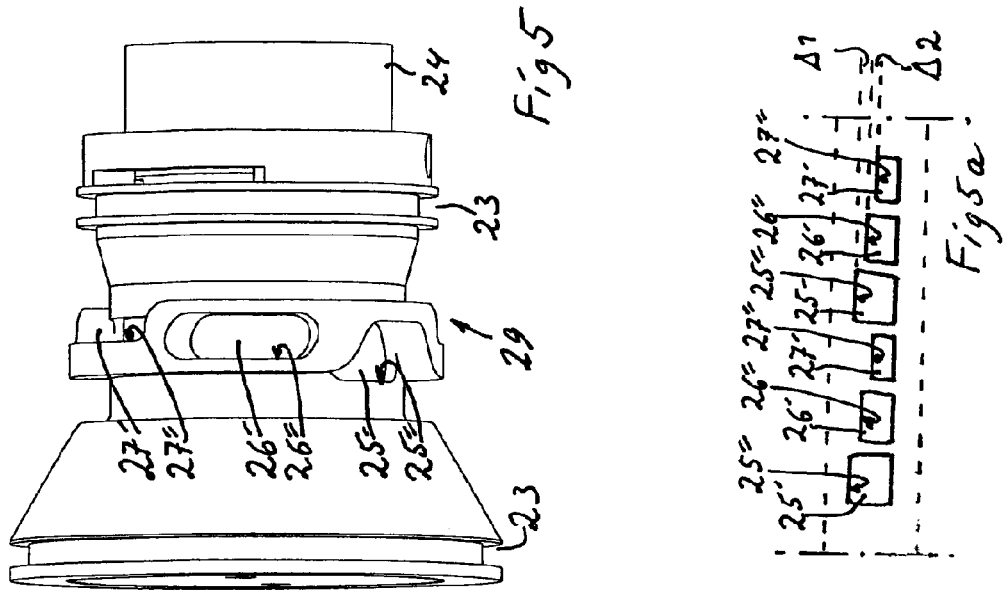
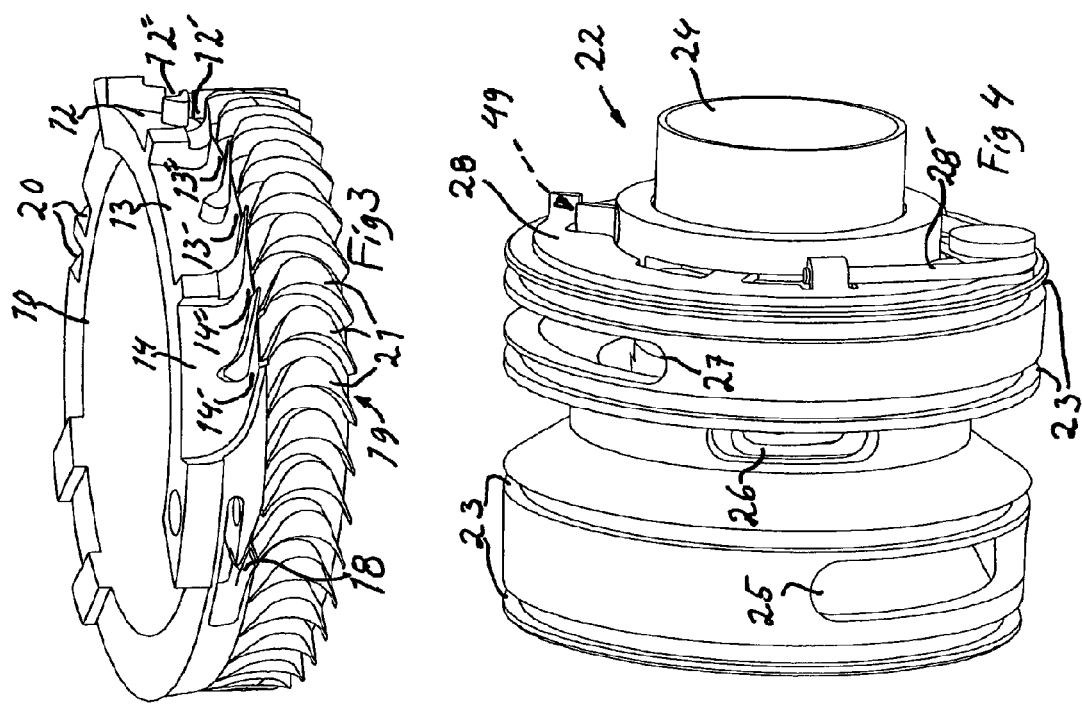

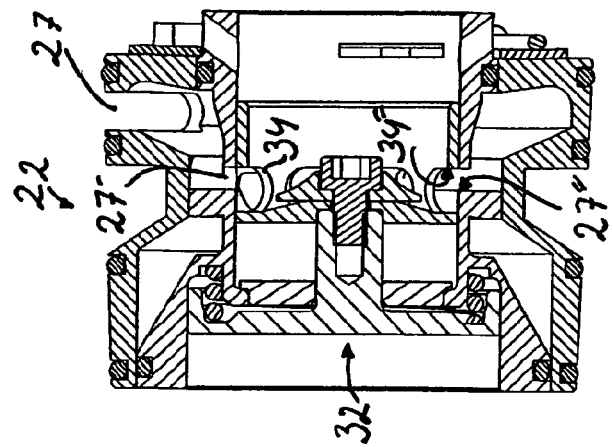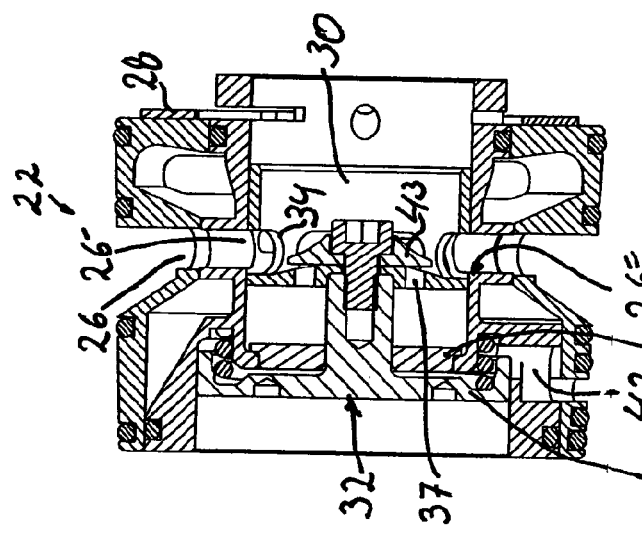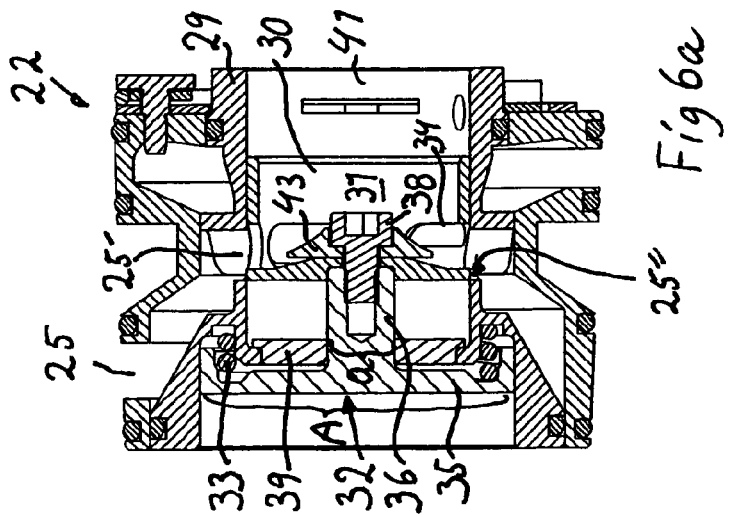

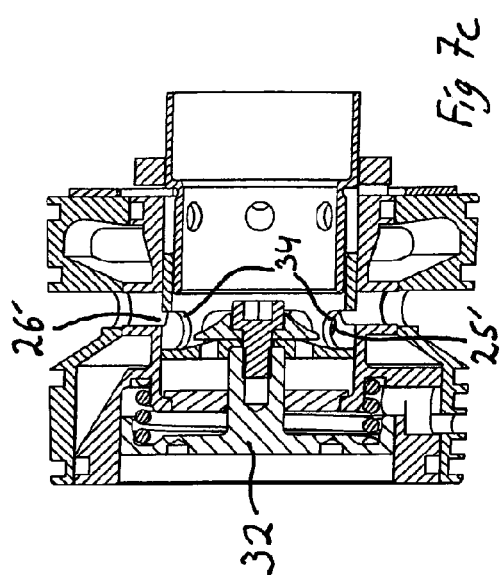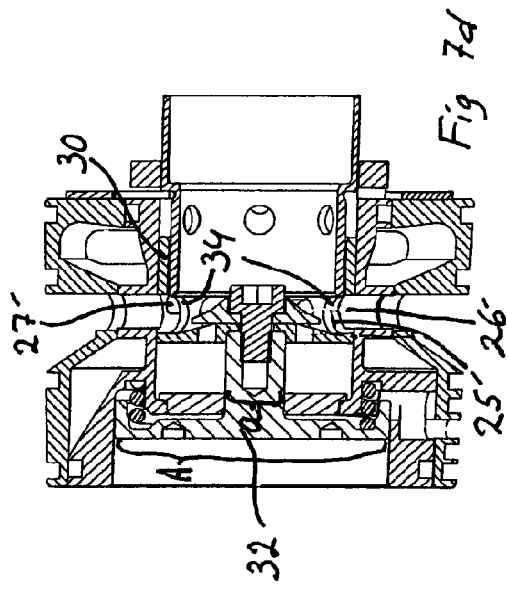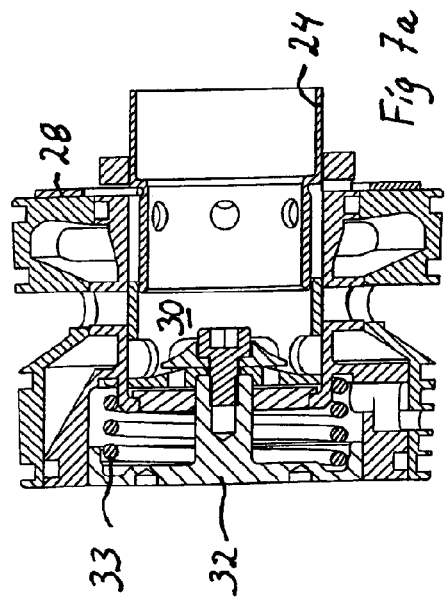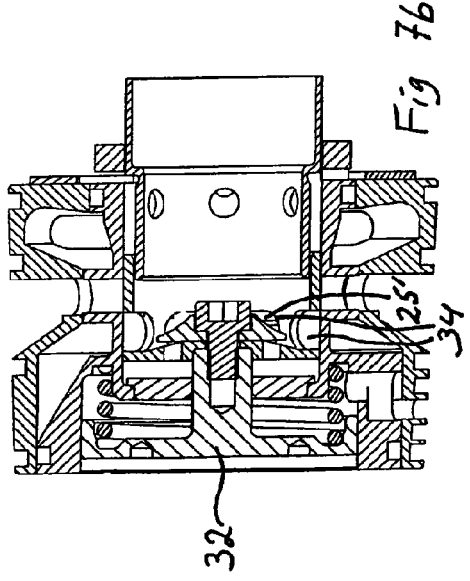

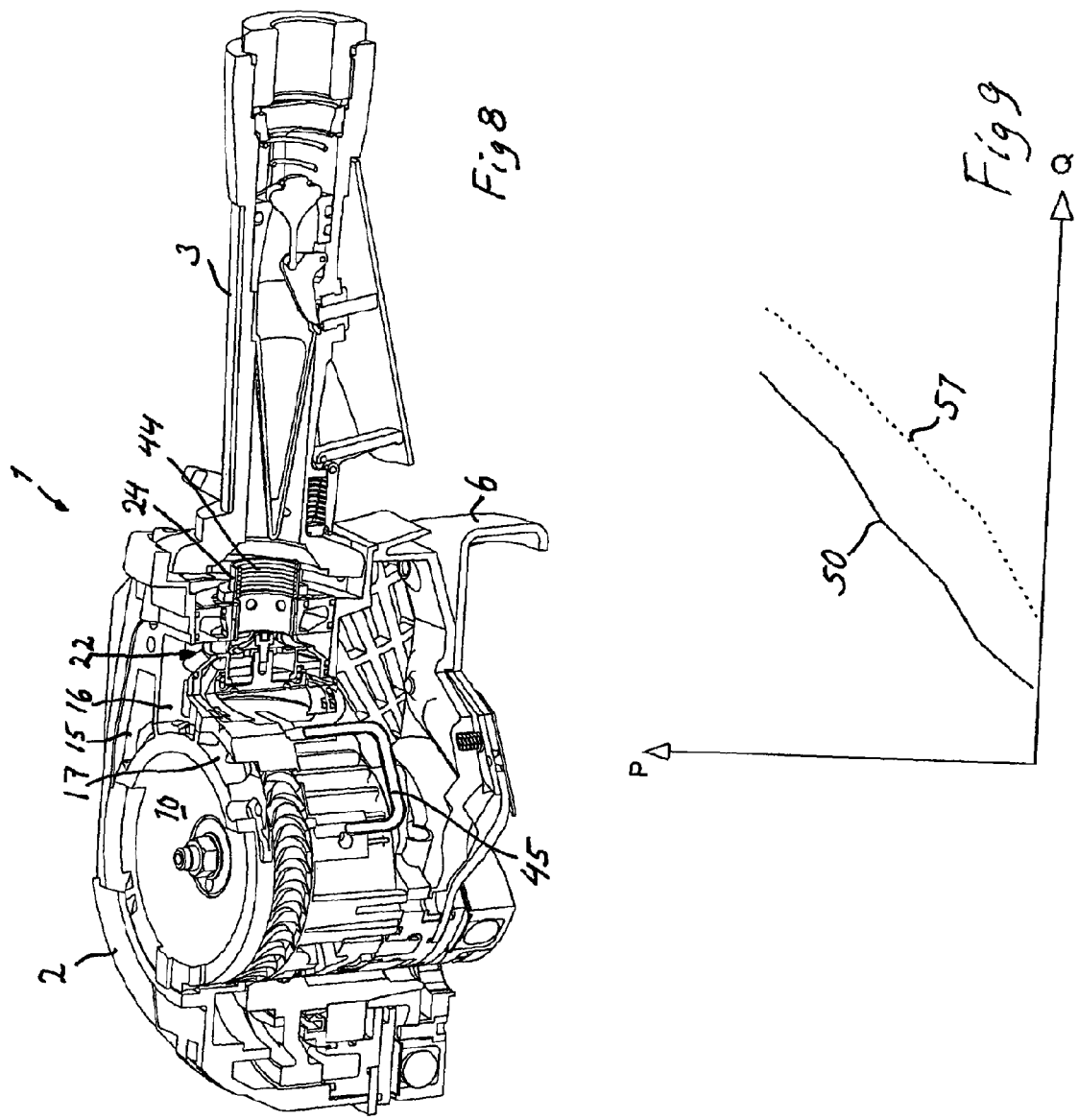

SPEED CONTROL DEVICE IN A PNEUMATIC POWER TOOL

This application is the U.S. national phase application of PCT/SE2009/000433 filed Oct. 2, 2009.

FIELD OF THE INVENTION

The invention concerns a speed control device for a pneumatic power tool and a pneumatic power tool including the speed control device.

BACKGROUND OF THE INVENTION

EP 0 575 301 B1 describes a pneumatic power tool having such a speed control device, named speed governor, which comprises a valve element and is ranged to control the pressure air flow as a response to a speed responsive control pressure.

In the previously known device, the speed governor has an air inlet flow control valve which is activated by a control pressure derived from the motive air flow. The output air from the speed governor valve unit of EP 0 575 301 B1 follows a passage inside the housing of the power tool through a feed passage so as to reach a plurality of nozzles. The valve element is balanced between a control pressure and inlet air pressure such that the air feed flow to the nozzles is sufficient to maintain the turbine wheel rotation speed at a desired level.

The power tool according to the background art works well, but a recent demand has raised requests for operational economy and in particular higher energy efficiency.

SUMMARY OF THE INVENTION

It is an aim of the present invention to provide a speed control device as stated above that addresses the drawbacks of the prior art and provides an energy saving and cost effective solution which is simple to use and which can be successfully used together with high effective pneumatic power tools of the kind having an air turbine with a high speed turbine wheel drivingly connected to an output spindle.

This aim is obtained through a speed control device according to the present invention.

Hereby it is possible to feed the turbine in steps corresponding to the required flow, and wherein for each step the prevailing air flow is more closely adapted to the best flow mode of the respective nozzles in the nozzles group or groups being active. It is thus avoided that the entire number of nozzles are fed with a relatively low flow such that the flow speed in each nozzle is ineffectively low, which will result in inferior operation of the power tool and unnecessary high air consumption and energy costs. In particular it is advantageous to operate a tool employing the invention such that the flow speed in operative nozzle(s) reaches the speed of sound.

In general it is possible to provide the device with any number n of nozzle groups (n being an integer, n>1) but it is of course practical to have a reasonable limitation of the number because of space limitations for feed passage etc. Normally it is therefore envisaged to have 2-4 nozzle groups in a hand-portable power tool according to the invention. Normally it is also envisaged to have 1-4 nozzles in each group (this being no limitation). It should be understood that in respect of n nozzle groups the valve unit is controlled so as to feed air to x of the n nozzle groups in dependence of the requirement for the particular state of operation, i.e. in practice prevailing load, $1 \leq x \leq n$, x being an integer.

As an example, when the number of nozzle groups is two: the valve unit is capable of being actuated such that in a first state, only a first air feed passage is connected to the pressure air inlet such that only a first one of the nozzle groups is fed with air, and in a second state, the first and a second air feed passages are connected to the pressure air inlet such that the first one and also a second one of the nozzle groups are fed with air. "State" here refers to operational states of the device.

The speed responsive parameter is preferably a speed responsive control pressure, and in particular related to an air flow downstream of the turbine wheel. The speed responsive parameter can, however also be in respect of a speed signal more or less directly indicating the rotational speed of an element in any one of the turbine, the transmission or the output shaft.

It is preferred that the valve unit includes a valve element which is coupled to piston means which in turn is arranged to be actuated by the speed responsive control pressure. Hereby it is possible to choose piston areas and area proportions without having to consider valve element dimensions, which is an advantage since it makes it possible to dimension these components more independent of each other and produce compact components that are easily integrated in a small size high effect power tool.

A control pressure is arranged to act on a first piston area which can be substantially larger than a second piston area, onto which high pressure inlet air pressure acts. According to a preferred embodiment, the valve element has a cylindrical skirt portion with one or more radial apertures which are arranged to co-operate with a number (n) of axially displaced or differently positioned radial openings in a valve housing, wherein the valve element is sealingly axially moveable, whereby radial openings are respectively connected to the respective air feed passages for transmitting air to the respective nozzle groups.

It is preferred that a safety valve sleeve is arranged to close the radial apertures of the valve element in the event that an excess tool speed is recognised.

Preferably the piston means has an enlarged portion having a first piston area A inside a piston chamber and which is coupled to the valve element over a stem portion having a section with the second piston area a, wherein the stem portion sealingly penetrates a wall separating the piston chamber and the valve chamber. In particular the space in the piston chamber opposite to the space where the first piston area A is position for action by a control pressure is vented to the surroundings.

Corresponding advantages are obtained with a pneumatic power tool which includes a speed control device according to the invention.

BRIEF DESCRIPTION OF DRAWINGS

The invention will now be described in greater detail by way of embodiment and with reference to the annexed drawings, wherein FIG. 1 shows a pneumatic power tool according to the invention in a perspective view, FIG. 2 shows the pneumatic power tool in a perspective view with a part of the housing removed for explanatory reasons, FIG. 3 shows a part of the turbine of the power tool in FIGS. 1 and 2 in a perspective view, FIG. 4 shows a valve unit for the power tool in a perspective view, FIG. 5 shows a part of the valve unit, namely the outside of a valve housing in a side view, FIG. 5a illustrates positions in openings in the housing, FIGS. 6a-c show in different sections the valve unit in order to illustrate flow passages therein, FIGS. 7a-7d show in an axial section the valve unit in different positions of the valve element, FIG. 8 shows a partial section of the power tool in FIGS. 1 and 2, and FIG. 9 shows a diagram over power as a function of sir consumption.

DESCRIPTION OF EMBODIMENTS

The invention is i.a. applicable to hand-portable grinding machines, such as angle grinders and cutting machines wherein it is advantageous to have a high power/weight ratio. Such a power tool 1 with a grinding disc 5 is shown in FIG. 1, wherein the tool has a housing 2, first and second handles 3 and 4, a safety hood 6 and a control lever 9. 7 indicates a pressure air inlet and 8 an inlet connection means.

In general, a turbine machine must be operated at high speeds of the turbine wheel in order to utilize the air flow most efficiently. A requirement for a tool according to the invention is that it is durable and rugged. The environment where the tool is used is often full of particles which could jeopardise the function of the tool if they are allowed to enter into critical portions of the tools, for example between moveable components.

In a tool according to the invention, the nominal speed must not be exceeded, since in respect of e.g. grinding disks, excess speed risks to disintegrate the disk and dangerously spread parts with high speed therefrom. It is, however, desired to come close to the nominal speed in operation, since the grinding process is enhanced with higher rotational tool speeds. The solution according to the invention results in that for a given air consumption the useful effect is enhanced and, reversely, at given effect, or power, the invention provides lower air consumption.

The tool 1 in FIG. 2 is thus shown with a housing portion removed, whereby is shown a nozzle unit 10 having a plurality of nozzles 11 separated in three groups viz, a first nozzle group 12, a second nozzle group 13 and a third nozzle group 14. These nozzle groups are individually connected to a valve unit (to be described below) over a respective first feed passage 15, a second feed passage 16 and a third feed passage 17.

In the tool according to the invention there are thus three nozzle groups n=3 and there are two nozzles in each group. This is more clearly illustrated in FIG. 3, wherein the nozzle unit 10 is shown positioned in co-operation with a turbine wheel 19. The nozzle group 12 includes two nozzles 12' and 12", the second nozzle group 13 two nozzles 13' and 13" whereas the third nozzle group 14 has two nozzles 14' and 14". Each nozzle is defined as a passage between respective vanes that are curved in order to provide an advantageous air flow through the device and to get an adequate flow direction in respect of the turbine wheel blades 21 of the turbine wheel 19. It goes without saying that the spaces above the respective nozzles 12', 12", 13', 13", 14', 14" are sealingly connected to the respective air flow passages in assembled state of the device. The nozzle unit is also shown without a housing wall that covers the nozzle groups on a radial outside of the nozzle unit as seen in a radial direction. Particle escape slots 20 (known from the applicant own U.S. Pat. No. 5,383,762) are arranged peripherally in the nozzle unit.

The nozzle unit 10 also includes an idle running nozzle 18, which is connected directly to the inlet air thus passed the valve unit for regulating air flow to the nozzle groups 12, 13 and 14.

FIG. 4 shows the outside of the valve unit 22 with exterior grooves 23 for sealing rings for sealing contact with other components inside the tool housing. 25 indicates a first valve outlet which in assembled state connects to the first feed passage. 26 indicates a second valve outlet arranged to connect to the second feed passage and 27 indicates a third valve outlet which is arranged to connect to the third feed passage. In FIG. 4 is also shown a pressure air inlet and, indicated with 24, a safety valve sleeve surrounding the pressure air inlet and co-operating with a safety release washer unit 28, which is comprised of two washer halves and a release spring 28', which urges the washer halves to be separated. In normal operation of the device, the washer halves are in the shown position, that is engaging the safety valve sleeve 24 and held together by means of a holding element (not shown) which is positioned in a region indicated with 49.

The component shown in FIG. 5 is a valve housing 29 being part of the valve unit 22. It has, essentially as seen in the Figure, three groups of radial openings, viz. first radial openings, whereof one 25' is shown in the Figure, second radial openings, whereof one 26' is shown in the Figure, and third radial openings, whereof one 27' is shown in the Figure. These openings are axially displaced in respect of control edges 25", 26" respectively 27" such that when co-operating with a corresponding control edge (34" in FIG. 6c) on a valve element (as described below), successive ones of the radial openings will open for communication to the outside of the valve unit of air entering the pressure air inlet.

The openings are shown in more detail in FIG. 5a, where an inside cylindrical valve housing envelope surface part is shown in a flat stage, wherein the respective openings 25', 26', 27' are shown with their respective control edges 25", 26", 27" being actually replaced by mutual distances Δ1 and Δ2.

In FIG. 6b is shown a first axial section in a stage where x=n=3 nozzle groups are in communication with the pressure air inlet. The valve unit 22 shown in FIG. 6a is shown in a section where a valve element 30 is axially movable inside a valve chamber 41 in the valve housing 29. The valve element 30 has a cylindrical skirt portion 31 with radial apertures 34 and co-operate with the radial openings 25', 26' and 27'. The valve element 30 has a bottom portion extending radially inside the valve chamber 41 and has an aperture for the connection to a piston means 32.

The piston means 32 has an enlarged piston portion 35 with an actuation area A being positioned in a piston chamber 40, wherein control pressure is arranged prevail during operation of the device. The enlarged piston portion is over a stem portion 36, which is cylindrical and which sealingly penetrates through a wall 39 between the piston chamber 40 and the valve chamber 41, rigidly connected to the valve element 30. The stem portion carries at a free end thereof a screw 38 which couples the valve element 30 to the piston means 32. The stem portion 36 has a sectional area a being clearly smaller than the area A.

The space between the enlarged piston portion 35 and the wall 39 is vented to the surroundings to a venting passage 42 (FIG. 6b). The screw 38 further carries a deflector element 43 which has the purpose of directing air flow towards the radial apertures 34 and to deflect possible particles into said radial apertures 34 such that they do not jeopardise the function of the valve unit.

In FIGS. 6a-6c, a valve element is thus displaced as far to the right as possible. That is the control pressure inside the piston chamber 40 is at its highest level, wherein pressure air is fed to all three groups of nozzles. In FIG. 6a it is shown that the radial aperture 34 allows communication with the first radial opening 25' and with the first valve outlet 25. In FIG. 6b is shown, through a second axial section, that the radial aperture 34 allows communication with the second radial opening 26' and with the second valve outlet 26. In FIG. 6c is shown that the radial aperture 34 allows communication with the third radial opening 27' and with the third valve outlet 27.

In FIG. 6b is also shown air passages 37 for ensuring that inlet air pressure prevails at the backside of the valve element 30.

It should be noted that the radial apertures and possibly also the radial openings, are preferably positioned evenly distributed around the circumferences of associated valve parts in order to obtain force balance in radial directions of said parts. This way the valve element will be relieved from side forces otherwise tending to press it against the wall of the cylinder, thereby creating frictional forces that would jeopardise the function and diminish the working life of the device. In one embodiment the radial apertures and radial openings appear in pairs that are diagonally positioned around the circumferences of the parts. Other solutions are that there are three or more apertures distributed with like angular separation, from each other.

In FIGS. 7a-7c the valve unit is shown in a closed state (7a) and three different operational states (7b-d). Each state corresponds to a certain axial displacement of the valve element.

In FIG. 7a the valve unit is closed because of the return spring 33, which urges the piston means 32 into an extreme position where no control pressure of such a magnitude exist that it is capable of movement of the piston means 32. All radial openings 25', 26' and 27' in the valve housing are closed by the valve element.

In FIG. 7b, the control pressure has reached a magnitude where the control device starts to open, whereby the radial apertures 34 allow communication with the first feed passage over the first radial opening 25'.

In FIG. 7c the pressure has increased such that the valve element and its radial apertures 34 allow communication also with the second radial opening 26', the second valve outlet 26 and the second feed passage. The first radial opening 25' is still open for communication with the pressure air inlet.

In FIG. 7d the pressure has increased further and also the third radial opening 27' has been opened at the same time as the first and second radial opening 25' and 26' respectively are still open.

In the FIGS. 7a-7d is shown the safety valve sleeve 24, which is locked in position by means of the release washer 28. After release of the washer 28, radially outwardly as seen in the pictures, the safety valve sleeve 24 is free to move and since it is biased in the direction towards the bottom of the valve element 30 by a spring (see FIG. 8), the radial apertures 34 in the valve elements are closed and the feed flow to the turbine also totally closed, whereby the power tool stops. This is as a response to sensed excess rotational speed of a tool, which is per se previously known and is thus therefore not described further here. Having the inside of the sleeve overlapping the skirt portion also protects the valve element and associated parts from wear etc. caused by particles being entrained in the pressure air.

The valve element is thus influenced in a closing direction by a force from inlet air pressure acting on the area a together with spring force from the spring 33. The valve element is further influenced in an opening direction by a force from control pressure acting on the area A. These forces are arranged to balance each other so as to obtain the desired operational characteristics for the tool during different loads. The higher the load, the more the control pressure will press the piston means and the valve element in the opening direction. It is advantageous that the stem portion is relatively thin, which gives small leakage even though there is a certain play relative to the hole in the wall 39. A relatively larger area A of the piston means reduces the required setting force. When the control pressure can be set at a lower level, the idle running nozzle can be designed more effectively, which reduces idle air consumption. It also reduces low pressure leakage.

In FIG. 8 is shown the power tool 1 partly sectioned and with various components removed for clarity. The valve unit 22 is shown and the three feed passages 15, 16 and 17. The safety valve sleeve 24 is shown with a spring 44 which is described above. In FIG. 8 is also shown a portion of a control pressure passage 45, which leads control pressure downstream of the turbine to the piston chamber as is described above. As a further feature could be mentioned that the control pressure inside the control pressure passage 45 can be adjusted in respect of a pressure prevailing in the passage directly downstream of the turbine for example by an adjustable set screw that allows bleeding to the outside of the tool.

In FIG. 9 are diagrammatically shown two curves representing power as a function of pressure air consumption for power tools. Curve 50 represents a power tool according to the invention, which displays a far better power—air consumption ratio and also better low power, low air consumption properties. This is because of the contribution, in stages, of the different nozzle groups because of the flow therein being more effective in the active nozzles, the result of which can be seen by the relative steep curve in the entire range of the curve, and in particular in respect of low load and part load. This as a comparison to curve 51, which is power as a function of pressure air consumption for a power tool according to the background art, wherein the air consumption is drastically higher, and wherein the curve is much flatter in the low power/low air consumption field.

The invention can be modified within the scope of the following claims. The number of nozzle groups can be different from three and the number of nozzles in each group can be different from two and the number of nozzles can also be different in different groups in one single tool. The nozzles can be constructed otherwise even if the chosen design has proved to be efficient and efficient to manufacture.

It is possible to use other valve devices and other control principles for the distribution of pressure air to the nozzle groups. One suggestion is to use a centrifugally regulated valve for controlling valve operation. Concerning choice of valve devices, a slightly modified pilot controlled n-outlet valve of any kind could be used even if the above described valve solution has proved to fully meet the high demands for the present kind of tools.

The invention can be used for various pneumatic tools employing turbine motors and is not limited to the tools described herein.

The invention claimed is:

1. A speed control device for a pneumatic power tool which includes a housing with a pressure air inlet, an output spindle, an air turbine with a turbine wheel drivingly connected to the output spindle, wherein a plurality of nozzles are arranged for directing motive air onto the turbine wheel, and wherein the speed control device includes a valve unit for controlling pressure air flow through the nozzles in response to a speed responsive parameter, wherein:

said plurality of nozzles are divided into n separate nozzle groups having individual air feed through individual air feed passages, wherein n is an integer and n>1;

the valve unit is capable of being actuated into n states for controlling air feed to said n nozzle groups, whereby for each subsequent state, x air feed passages are connected to the pressure air inlet such that nozzle groups 1 to x are fed with air, wherein x is an integer and $1 \leq x \leq n$, the valve unit includes a valve element which has a cylindrical skirt portion with one or more radial apertures which are arranged to co-operate with a number (n) of axially differently oriented radial openings in a valve housing, wherein the valve element is sealingly axially movable, and said radial openings are respectively connected to said air feed passages, and the one or more radial apertures are positioned to be evenly distributed around the circumferences of associated valve parts in order to obtain force balance in radial directions of said parts.

2. The device according to claim 1, wherein the speed responsive parameter is a speed responsive control pressure, and the valve element is coupled to piston means which in turn is arranged to be actuated by said speed responsive control pressure.

3. The device according to claim 2, wherein a channel for transmitting said control pressure is connected for the action of the pressure on a first piston area of the piston means, and means for transmitting the inlet air pressure is connected for the action of the pressure on a second piston area of the piston means for balancing the piston means and the thereby the valve element between said pressures.

4. The device according to claim 2, wherein a spring means is arranged to bias the valve element towards an inactive position.

5. The device according to claim 4, wherein a safety valve sleeve is placed in the region of the pressure air inlet and is biased by a spring from a first position, where the safety valve sleeve is held by a release washer unit, towards a second position where the safety valve sleeve closes said one or more radial apertures.

6. The device according to claim 3, wherein the piston means has an enlarged portion having the first piston area inside a piston chamber and being coupled to the valve element over a stem portion which has a section having the second piston area, said stem portion sealingly penetrating a wall separating the piston chamber from a valve chamber being defined by the cylindrical valve housing.

7. The device according to claim 6, wherein a space in the piston chamber opposite to a space where the first piston area is positioned is vented to the surroundings.

8. The device according to claim 6, wherein the stem portion carries a deflector element for guiding inlet air and possible unwanted solid particles in the direction of the one or more radial apertures.

9. The device according to claim 1, wherein the speed responsive parameter is one of a speed responsive control pressure and a rotational speed signal.

10. The device according to claim 1, wherein the radial openings are positioned to be evenly distributed around the circumferences of associated valve parts in order to obtain force balance in radial directions of said parts.

11. A pneumatic power tool including a housing with a pressure air inlet, an output spindle, an air turbine with a turbine wheel drivingly connected to the output spindle, and a plurality of nozzles for directing motive air onto the turbine wheel, wherein the pneumatic power tool includes the speed control device of claim 1.

12. The pneumatic power tool according to claim 11, further comprising an idle running nozzle and an idle flow air passage for connecting the idle running nozzle with the pressure air inlet.

* * * * *